United States Patent [19]

Brusasco

[11] 4,281,566
[45] Aug. 4, 1981

[54] SPEED REDUCTION UNIT

[75] Inventor: Enzo Brusasco, Turin, Italy

[73] Assignee: Roltra S.p.A., Turin, Italy

[21] Appl. No.: 7,743

[22] Filed: Jan. 30, 1979

[30] Foreign Application Priority Data

Feb. 2, 1978 [IT] Italy ............................. 67198 A/78
Apr. 28, 1978 [IT] Italy ............................. 67968 A/78

[51] Int. Cl.³ ............................................ F16H 1/28
[52] U.S. Cl. ........................................ 74/800; 64/29
[58] Field of Search ................. 74/800, 801, 804, 60, 74/123, 86, 380, 116, 122; 64/29

[56] References Cited

U.S. PATENT DOCUMENTS

| 453,903 | 6/1891 | Good | 74/800 |
|---|---|---|---|
| 1,671,497 | 5/1928 | Trumpler | 74/800 |
| 1,748,907 | 2/1930 | Vallance | 74/800 |
| 2,330,734 | 9/1943 | Paul | 64/29 |
| 2,390,908 | 12/1945 | Young | 64/29 |
| 3,139,772 | 7/1964 | Maroth | 74/800 |
| 3,385,135 | 5/1968 | Strandberg | 74/800 |
| 3,540,307 | 11/1970 | Schell | 74/800 X |
| 3,640,154 | 2/1972 | Massie | 74/800 |
| 3,661,036 | 5/1972 | Quiram et al. | 74/800 |
| 4,041,808 | 8/1977 | Fickelscher | 74/800 |

Primary Examiner—Allan D. Herrmann
Attorney, Agent, or Firm—Ladas & Parry

[57] ABSTRACT

A speed reduction unit in which an input shaft and an output shaft, coaxial with respect to one another are rotatably supported by an outer casing enclosing a face gear connected to the said output shaft, a bevel gear facing said first gear and coupled therewith, and connection means between said bevel gear and said input shaft, the number of the teeth of the said two gears differing from one another by at least one tooth; bevel gear being inclined with respect to said face gear, and being centrally supported inside said casing by means of a ball joint support in order to oscillate relative to the said casing and said face gear about a point of the common axis of the said two shafts.

9 Claims, 2 Drawing Figures

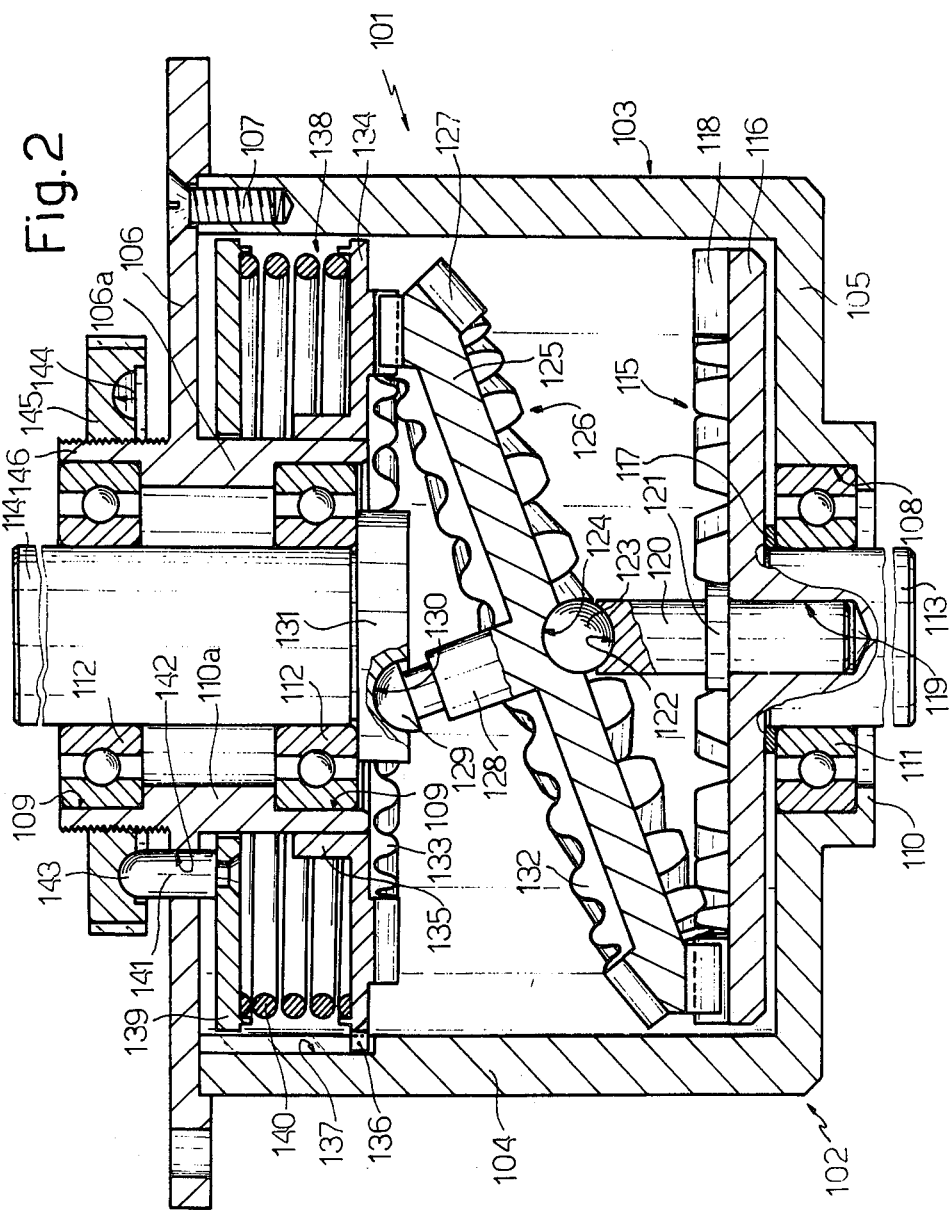

SPEED REDUCTION UNIT

BACKGROUND OF THE INVENTION

The present invention relates to a speed reduction unit.

Speed reduction units are known which comprise an input shaft, an output shaft, a first gear keyed on the said output shaft and a second gear connected to the said input shaft, and in which a 360° rotation of the input shaft produces a rotation of the output shaft corresponding to an advancement of the said first gear by one or more teeth.

Generally, such known reduction units are of the type with planocentric gears in which the said first gear is an internal gear having n teeth, and the second gear is a gearwheel having n-x teeth and a diameter smaller than that of the said internal gear so that it can be accomodated inside the latter. Moreover, the said gearwheel is rotatably coupled with a central disc which is integral with the input shaft, but is positioned eccentrically with respect to it.

In use, because of the presence of the said eccentric disc, to a rotation of the input shaft does not correspond any rotation of the said gearwheel, but a transversal movement of it, owing to which the teeth of this gearwheel successively mesh with the teeth of the said internal gear. If, as said before, the number of the teeth of the internal gear is n and that of the gearwheel is n-x; to a complete revolution of the input shaft in one direction corresponds a rotation of the output shaft in the opposite direction, equal to a number x (in a border-line event a single tooth) of the internal gear.

It clearly results from the foregoing that to obtain the successive meshing of the teeth of the gearwheel with those of the internal gear, the manufacturing tolerances of the single elements must necessarily be relatively close; accordingly, the manufacturing costs are relatively high and such as to inhibit the use of such reduction units in many cases in which their use would be technically advisable.

SUMMARY OF THE INVENTION

The object of the present invention is to provide a reduction unit which is simple and relatively economical to manufacture and yet has the same functional advantages of the reductors with planocentric gears.

This object is attained by the present invention by means of a speed reduction unit comprising an outer casing, an input shaft and an output shaft coaxial with respect to one another and rotatably supported by the said casing, a first gear integral with the said output shaft, a second gear coupled with the said first gear, and connection means between the said second gear and the said input shaft, the number of the teeth of the said two gears differing from one another by at least one tooth; and in which the said first gear is a face gear and the said second gear is a bevel gear, sloping with respect to the first gear and positioned in face of it, and centrally supported inside the said casing by means of a ball joint support in order to swing relative to the said casing and the said first gear about a point of the common axis of the said two shafts; the said connection means comprising an axial central projection extending from the said second gear, and key means being provided for angularly locking the said second gear relative to the said casing.

BRIEF DESCRIPTION OF THE DRAWINGS

Further characteristics and advantages of the present invention will become apparent from the following description with reference to the FIGS. 1 and 2 of the annexed drawings showing by way of non limiting examples and in axial cross sections, two different embodiments of a speed reductor according to the teachings of the present invention.

DETAILED DESCRIPTION OF THE INVENTION

Figure 1:
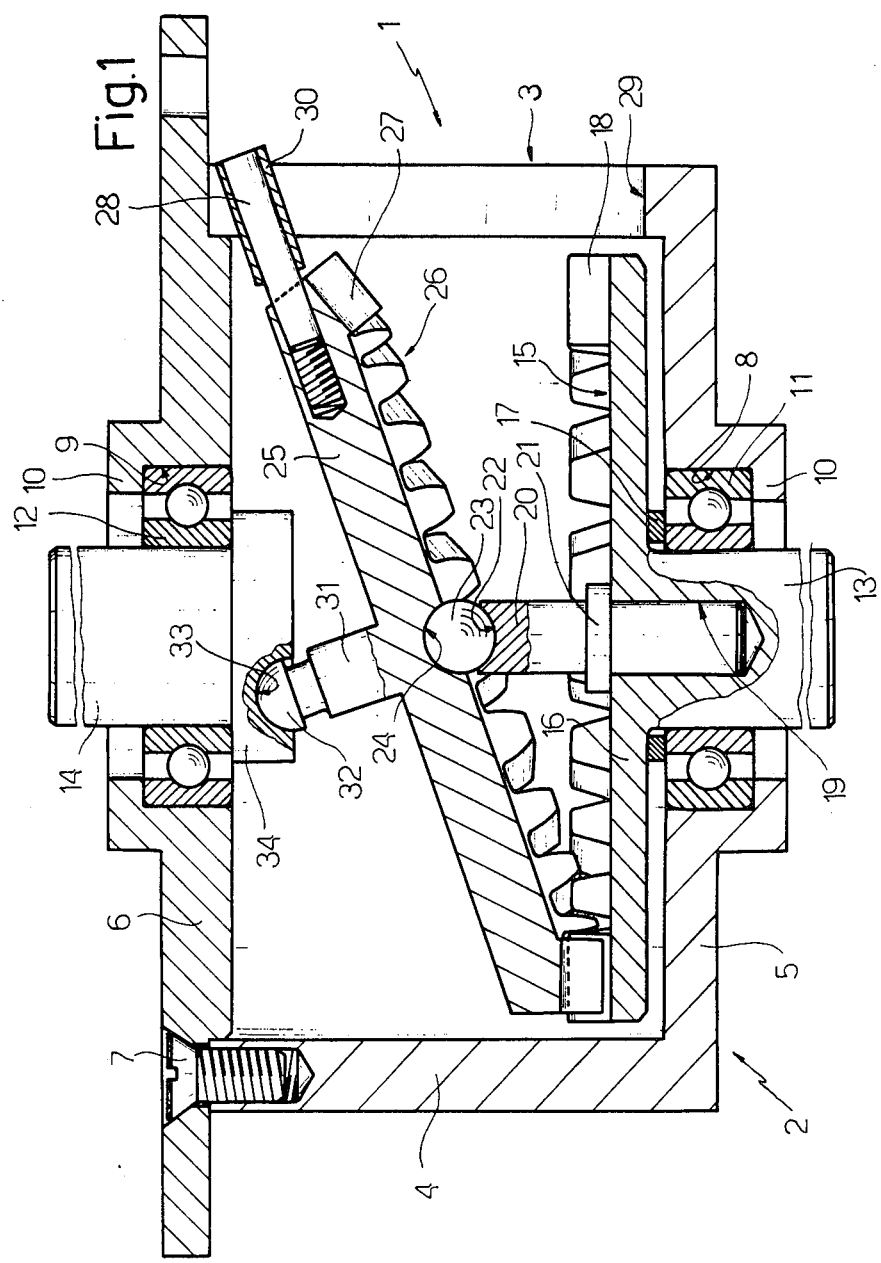

FIG. 1 shows a speed reduction unit generally designated 1, which comprises an outer casing 2 formed by a cup-shaped body 3 comprising a cylindrical sidewall 4 and a bottom wall 5, and a substantially plane cover 6 connected to the free end of the sidewall 4 by means of screws 7. Bottom wall 5 and cover 6 are provided with through holes 8 and 9 respectively, which are coaxial with one another and provided each with an inner flange 10 and through which rotatably extend, with the interposition of respective bearings 11 and 12, an output shaft 13 and an input shaft 14 coaxial with one another.

The end of shaft 13 situated inside the casing 2 is integral with a face gear 15 formed by a radial flange 16 resting on the bearing 11 with the interposition of a ring 17 and having, on its own periphery, a face toothing 18 extending from the surface of flange 16 facing the cover 6.

Shaft 13 is provided, on its end located inside the casing 2, with an axial cylindrical cavity 19, inside which there is mounted the end of a pin or upright 20 provided centrally with an annular bearing flange 21 in contact with the surface of flange 16 facing the cover 6. Formed on the free end of the pin 20 is a seating 22 shaped like a spherical bowl, inside which there is arranged a ball 23 whose portion projecting from the seating 22 engages a substantially semispherical seating 24 formed centrally on a plate 25 which constitutes the central portion of a gear 26 having a bevel toothing 27 of which at least one tooth engages the space between two adjacent teeth of the face toothing of the gear 15. To this end, since the ball joint formed by the ball 23 and the seatings 22 and 24 is disposed at a level different from that of the toothing 18, gear 26 is sloping relative to gear 15 by an angle which preferably is such that the pitch surfaces of the teeth of the toothings 18 and 27 are parallel with one another in the meshing point of the said two gears.

Bevel gear 26 is angularly fixed relative to the casing 2 by means of a key device comprising a pin 28 rigidly connected to the gear 26 and extending radially from it to rotatably and tranversely slidably engage an axial slot 29 formed in the cylindrical sidewall 4 of casing 2. In order to reduce the friction forces between the edges of slot 29 and the pin 28, this latter is provided with a outer cylindrical bushing 30 whose outer diameter is substantially equal to the width of the slot 29.

Plate 25 of the gear 26 is formed, on its side opposed to that provided with seating 24, with an axial central projection 31 having at its free end a semispherical head 32 engaged inside a semispherical seating 33 eccentrically formed on the free surface of a disc 34 which is rigidly connected to and coaxial with the end of the shaft 14 located inside the casing 2, and abuts on the bearing 12.

In use, during the rotation of the input shaft 14, disc 34, because of the eccentricity of the seating 33, acts as a crank for the projection 31 and makes it rotate about a cone whose apex coincides with the center of the ball 23.

A displacement of the axis of the projection 31 along the surface of the said cone gives rise to an oscillation of the gear 26 about the center of the ball 23. This oscillation is the result of the combination of two different movements constituted, the first one, by an angular displacement of the gear 26 about an axis parallel to the axis of the pin 28, and the second by an angular displacement of the gear 26 about an axis passing through the center of the ball 23 and perpendicularly to the slot 29. The oscillation of the gear 26 resulting from the combination of these movements causes the meshing point between gears 26 and 15 to travel all along the gear 26 during the 360° rotation of the shaft 14, whilst the pin 28 covers two times the whole length, there and back, of the slot 29.

Since, as stated above, the gear 26, because of the presence of the pin 28, is angularly fixed relative to the casing 2, at the end of a complete revolution of the shaft 14 the tooth of the gear 26 which was in mesh with the gear 15 at the beginning of the revolution of the shaft 14, engages again the gear 15 in the same starting point with respect to the casing 2. Accordingly, a difference in the number of teeth of the gears 26 and 15 generates an angular displacement of the gear 15 in either direction with respect to the casing 2. In particular, for example in the case of gear 26 having one tooth more than gear 15, a 360° rotation of shaft 14 gives rise to a rotation of the shaft 13 in the opposite direction by an angle equal to the amplitude of a tooth of the gear 15. Conversely, in the case for example, of gear 15 having one tooth more than gear 26, a 360° rotation of the shaft 14 gives rise to a rotation of the shaft 13 in the same direction by an angle equal to the amplitude of a tooth of the gear 15.

Thus, the reduction ratio obtainable by means of the speed reducer 1 described hereinabove will be proportional to the number of teeth of the gear 15 and inversely proportional to the difference between the number of teeth of the gear 15 and the number of teeth of the gear 26.

In the speed reduction unit described hereinabove, the use of frontally mating gears allows using relatively ample manufacturing tolerances thereby obtaining a drastic reduction of the production costs. Furthermore, the use of frontally mating gears permits to realize in a simple and economical way not only reverse reduction units, but also simple reduction units, which is very difficult to obtain by means of planocentric gears.

It is suitable to point out the speed reduction unit 1 described hereinabove is completely irreversible, since any torque applied onto the shaft 13, and consequently onto the gears 15 and 26, is completely taken up by the pin 28 engaged within the slot 29.

FIG. 2 shows a speed reduction unit generally designed 101 which comprises an outer casing 102 formed by a cup-shaped body 103 and comprising a cylindrical sidewall 104 and a bottom wall 105, and a substantially plane cover 106 connected to the free end of the sidewall 104 by means of a plurality of screws 107. Bottom wall 105 has an axial through hole 108 provided with an inner flange 110 and through which rotatably extends, with the interposition of a bearing 111, an output shaft 113.

Extending through the cover 106 is an axial sleeve 106a provided with an axial through hole 109 coaxial with the hole 108, and having a restricted central region 110a acting as a distance piece for two bearings 112 supporting an input shaft 114 coaxial with the shaft 113.

The end of shaft 113 located inside the casing 102 is integral with a face gear 115 formed by a radial flange 116 resting on the bearing 111 with the interposition of a ring 117 and having, on its own periphery, a face toothing 118 extending from the surface of the flange 116 facing the cover 106.

Shaft 113 is provided, on its end located inside the casing 102, with an axial cylindrical cavity 119, inside which there is mounted the end of a pin or upright 120 provided centrally with an annular bearing flange 121 in contact with the surface of flange 116 facing the cover 106. Formed on the free end of the pin 120 is a seating 122 shaped like a spherical bowl, inside which there is rotatably arranged a ball 123 whose portion projecting from the seating 122 rotatably engages a substantially semispherical seating 124 formed centrally on a plate 125 which constitutes the central portion of a gear 126 having a bevel toothing 127 the number of teeth of which differs by at least one tooth from that of the teeth of the toothing 118. In order to allow the toothing 127 to mesh, by at least one tooth, with the toothing 118, the gear 126 is sloping relative the gear 115 by an angle which preferably is such that the pitch surfaces of the teeth of the toothings 118 and 127 are parallel with each other in the meshing point of the said two gears.

Plate 125 of the gear 126 has, on its side opposed to that provided with the seating 124, an axial central projection 128 provided with a semispherical head 129 engaged inside a semispheric seating 130 eccentrically formed on the free surface of a disc 131 which is rigidly connected to and coaxial with the end of shaft 114 located inside the casing 102, and abuts on the inner bearing 112.

Bevel gear 126 is prevented from rotating relative to the casing 102, by means of a key device comprising a substantially bevel toothing 132 formed on the surface of plate 125 opposed to that provided with the toothing 127, and a toothing 133 formed on a surface parallel with and facing the flange 116. The number of teeth of the toothing 133 is equal to that of the toothing 132, and in its normal working position the toothing 133 meshes with at least one tooth of the toothing 132. Analogously with the coupling 118-127, also in the coupling 132-133 the pitch surfaces of the toothings 132 and 133 preferably are parallel with one another in the meshing point.

In an embodiment not shown, toothing 133 is formed directly on the inner surface of the cover 106 in a position directly facing the toothing 118; on the contrary; in the embodiment shown, the toothing 133 is formed on a disc 134 having an axial sleeve 135 rotatable and axially slidable on the sleeve 106a, and is provided with a plurality of radial projections 136 (of which only one is shown) slidable inside respective axial grooves 137 formed along the inner surface of the wall 104.

Disc 134 constitutes an end plate of a torque limiting device generally designed 138 and comprising a further annular disc 139 slidable on the sleeve 106a, and a spring 140 compressed between the discs 134 and 139. This latter, analogously with the disc 134, is angularly constrained to the casing 102 by means of a plurality of pins 141 (only one of which is shown in the drawings) uniformly distributed along a circumference coaxial with the sleeve 106a and extending axially from the surface of disc 139 facing the cover 106. Each pin 141 engages in an axially slidable fashion a respective hole 142 formed through the cover 106 and terminates, outside the casing 102, with a spherical head 143. Head 143 slidably engages an annular groove 144 formed frontally on a ring nut 145 adjustably mounted on an externally threaded section 146 of the sleeve 106a projecting outside the casing 102.

As regards the behaviour, during the use, of the speed reduction unit 101 described hereinabove, reference is made to what has already been said in relation to the speed reduction unit 1. However, it is suitable to note that, just as the difference between the number of teeth of the toothing 118 and that of the toothing 127 involves, at each complete revolution of the shaft 114, a displacement of the toothing 118 relative to the casing 102 by an angle corresponding to the excess or deficiency of teeth of the said toothing 118 relative to the toothing 127, the fact that the toothings 132 and 133 have the same number of teeth maintains angularly stationary the plate 125 relative to the toothing 132 and, consequently, to the casing 102.

Obviously, the "key effect" obtained by means of the two conjugated surfaces formed by the toothings 132 and 133 may be obtained by means of a pair of conjugated surfaces tangent to one another, one of which is substantially conical and the other is substantially plane and obtained as a projection of first one, these surfaces being configured in such a way as to allow the said conical surface to precessionally roll along the plane surface in such a way that each point of the said two surfaces always comes into contact with the same point of the other surface.

On the ground of the foregoing, it would be possible to substitute the toothings 132 and 133 by two simple knurled surfaces or, at least, by two surfaces having a high coefficient of friction.

As regards the torque limiting device 138, it has to be pointed out that when the stall torque transmitted from the toothing 132 to the toothing 133 becomes such as to push the disc 134 towards the cover 106 against the action of the spring 140, the angular bond between the casing 102 and the plate 125 is suppressed, and the said plate no more transmits any torque to the plate 116 and, consequently, to the shaft 113. The limit value of the stall torque for which the said disengagement between plate 125 and casing 102 takes place, can be adjusted by loading more or less the spring 140 by means of the adjustment ring nut 145 mounted on the portion 146 of the sleeve 106a.

What we claim is:

1. A speed reduction unit comprising an outer casing, an input shaft and an output shaft coaxial with respect to one another and rotatably supported by said casing, a first gear integral with said output shaft, a second gear coupled with said first gear, and connection means between said second gear and said input shaft, the number of teeth of said two gears differing from one another by at least one tooth; and in which said first gear is a face gear and said second gear is a bevel gear sloping with respect to the first gear and positioned to face it, said second gear being centrally supported inside said casing by means of a ball joint support in order to oscillate relative to said casing and said first gear about a point of the common axis of said two shafts, said connection means comprising a central axial projection extending from said second gear, key means being provided for angularly locking said second gear relative to said casing, said ball joint support comprising an upright extending axially from said first gear towards said second gear and a ball interposed between the free end of said upright and said second gear, a first seating spherical in shape for said ball being formed on said upright, a second seating spherical in shape for said ball being formed centrally on said second gear.

2. A speed reduction unit as claimed in claim 1, wherein said connection means comprise crank means interposed between said axial projection and said input shaft.

3. A speed reduction unit as claimed in claim 1 or 2, wherein said axial projection is provided with a spherical head engaged inside a semispherical seating formed eccentrically on one end of said input shaft.

4. A speed reduction unit as claimed in claim 1, wherein said key means comprises a pin extending radially from said second gear and guide means integral with said casing and extending parallel to the axis of said input and output shafts, said pin engaging said guide means in a rotatable and tranversely slidable fashion.

5. A speed reduction unit as claimed in claim 4, wherein said guide means comprise an axial slot formed on said casing.

6. A speed reduction unit as claimed in claim 1, wherein said key means comprise first and second annular surfaces substantially conjugated with one another and facing and angularly connected to said casing and said second gear, respectively, said first surface being substantially perpendicular to said input and output shafts, said second surface being substantially parallel with said second gear, and said two surfaces being at any moment angularly connected to one another through reciprocal engagement of a portion of them.

7. A speed reduction unit as claimed in claim 6, wherein said first and second annular surfaces are, respectively, a face toothing and a bevel toothing supported by said second gear, said bevel toothing having a number of teeth equal to that of said face toothing coupled therewith.

8. A speed reduction unit as claimed in claim 6 or 7, wherein said first surface is formed on an element which is part of a torque limiting device.

9. A speed reduction unit as claimed in claim 8, wherein said torque limiting device comprises a disc disposed inside said casing and angularly stationary with respect to it, said disc being disposed to face said second gear and being provided with said first surface, said disc being slidable axially relative to said casing against the action of resilient means, adjustment means being provided for adjusting the compression tension of said resilient means.

* * * * *